United States Patent
Tsai

(10) Patent No.: US 8,300,283 B2
(45) Date of Patent: Oct. 30, 2012

(54) SCANNING SYSTEM HAVING BRIGHTNESS COMPENSATION APPARATUS AND METHOD THEREOF

(75) Inventor: Mi-lai Tsai, Keelung (TW)

(73) Assignee: Genesys Logic, Inc., Taipei (TW)

( * ) Notice: Subject to any disclaimer, the term of this patent is extended or adjusted under 35 U.S.C. 154(b) by 700 days.

(21) Appl. No.: 12/430,273

(22) Filed: Apr. 27, 2009

(65) Prior Publication Data
US 2010/0182656 A1 Jul. 22, 2010

(30) Foreign Application Priority Data
Jan. 16, 2009 (TW) .............................. 98101695 A

(51) Int. Cl.
*H04N 1/04* (2006.01)
*G06F 15/00* (2006.01)
*G06K 9/40* (2006.01)

(52) U.S. Cl. .......... 358/475; 358/474; 358/1.9; 382/274
(58) Field of Classification Search .................. 358/475, 358/474, 1.9; 382/274
See application file for complete search history.

(56) References Cited

U.S. PATENT DOCUMENTS

| 2004/0047007 A1* | 3/2004 | Kanno | 358/474 |
| 2005/0078339 A1* | 4/2005 | Hori | 358/445 |
| 2007/0195347 A1* | 8/2007 | Momose et al. | 358/1.9 |
| 2008/0050034 A1* | 2/2008 | Nishida et al. | 382/274 |

* cited by examiner

*Primary Examiner* — Charlotte M Baker
*Assistant Examiner* — Rury Grisham

(57) ABSTRACT

A scanning system having a brightness compensation apparatus and method thereof are described. The brightness compensation apparatus includes a statistics window control unit, a brightness statistics logic unit, and a comparing logic unit. The statistics window control unit sets a statistics window setting area. The brightness statistics logic unit generates the current brightness statistics data corresponding to the current page. The comparing logic unit compares the current brightness statistics data with brightness target value to determine whether the brightness compensation apparatus compensates the brightness of next page based on the comparison result and/or image gain of the current page for adjusting the brightness of the scanning system according to the compared result between the brightness statistic data and the brightness target value.

11 Claims, 4 Drawing Sheets

US 8,300,283 B2

SCANNING SYSTEM HAVING BRIGHTNESS COMPENSATION APPARATUS AND METHOD THEREOF

CLAIM OF PRIORITY

This application claims priority to Taiwanese Patent No. 098101695 filed on Jan. 16, 2009.

FIELD OF THE INVENTION

The present invention relates to a brightness compensation apparatus and method thereof, and more particularly relates to a scanning system having a brightness compensation apparatus and method thereof for compensating the brightness of document page and/or articles positioned on a platform of a scanning system.

BACKGROUND OF THE INVENTION

With the rapid development of information technology, electrical document are widely used. However, for the purpose of storage, processing and delivery via internet network of the documents, it is necessary to scan the paper document into the format of electrical documents, particularly, for the intention of clarity of the documents while delivering these documents. Therefore, it is quite important to ensure that the scanning quality of the paper documents meets the requirement. Conventionally, it needs a period of warm-up time before the scanner starts to operate. When the scanner scans a plurality of pages of the document, the lamp brightness of the scanner is gradually increased with the increment of the scanned pages. Thus, there is a brightness difference between the current page and the previous page so that the scanning quality of the pages of the document is affected since the scanning brightness for each page is not uniform. For example, the scanning brightness provided by the lamp for the last page is considerably greater than that of the first page of the document.

FIG. 1 is a schematic block diagram of a conventional scanner 100 with brightness compensation. The scanner 100 includes a lamp 102 an image sensor 104, an analog-front-end (AFE) 106, an image processor 110, a direct-current (DC) voltage control unit 112 and an inverter 114. The image processor 110 further includes an image processing module 116. The lamp 102 provides light source to illuminate the page of the document. The image sensor 104 senses the image data on the pages for outputting the analog image data. The analog-front-end (AFE) 106 converts the analog image data into the digital image data. The image processor 110 processes the digital image data by using the image processing module 116. The direct-current (DC) voltage control unit 112 outputs the DC voltage. The inverter 114 is coupled to the DC voltage control unit 112 for receiving the DC voltage and outputs a constant DC voltage to control the brightness of the lamp 102. However, the image processor 110 cannot adjust the image gain of the digital image data using the image processing module 116 so that the scanned brightness on the page is not uniform. In addition, the DC voltage control unit 112 and the inverter 114 use constant voltage to drive the lamp 102 but do not receive the control information from the image processor 110 so that the illuminance of each page is variable disadvantageously, thereby downgrading the scanning quality of the document. Consequentially, there is a need to develop a novel scanning technique to solve the aforementioned problems.

SUMMARY OF THE INVENTION

One objective of the present invention is to provide a scanning system having a brightness compensation apparatus and method thereof for compensating the brightness of document page and/or articles placed on a scanning system.

According to the above objective, the present invention sets forth a scanning system having a brightness compensation apparatus and method thereof. The scanning system includes a light source, an image sensor, an analog-front-end (AFE), a brightness compensation apparatus, a second voltage control circuit and an inverter. The brightness compensation apparatus includes an analog-front-end (AFE) control unit, an image processor and a first voltage control circuit. The image processor further includes an image processing module, a statistic window control unit, brightness statistic logic unit and a comparison logic unit.

The light source generates a brightness to illuminate the pages. For example, the light source is one or more lamps. The image sensor senses image data on the pages in order to output analog signal data corresponding to the image data. The analog-front-end coupled to the image sensor converts the analog signal data into digital signal data. In one embodiment, the analog-front-end is one or more analog-front-end modules. The analog-front-end (AFE) further includes a digital-analog converter (DAC), an analog-digital converter (ADC) and an operational amplifier (OAMP). The brightness compensation apparatus coupled to the analog-front-end adjusts the brightness illuminated on the pages. The second voltage control circuit coupled to the first voltage control circuit outputs a direct-current (DC) voltage. The inverter coupled to the second voltage control circuit receives the DC voltage and outputs an alternating current (AC) voltage with high level in order to control the brightness by at least one level of the DC voltage.

The image processing module receives digital signal data which are converted format of analog image data. The statistic window control unit coupled to the image processing module establishes a statistic window setting region wherein the statistic window setting region serves as a reference region of brightness statistic data associated with each of the pages. The brightness statistic logic unit coupled to statistic window control unit generates current brightness statistic data of a current page based on the statistic window setting region. The comparison logic unit coupled to the brightness statistic logic unit compares the brightness statistic data with a brightness target value to determine whether the brightness statistic data is the same as the brightness target value.

In the comparison logic unit, when the current brightness statistic data is different from the brightness target value, the image processing apparatus utilizes an adjusting signal based on a brightness difference between the current brightness statistic data and the brightness target value for compensating the brightness of a light source for adjusting the brightness of the scanning system according to the compared result between the brightness statistic data and the brightness target value so that the brightness for a next page is the same as the brightness target value. When the current brightness statistic data is the same as the brightness target value, the scanning system scans a next page by using the brightness of the current page.

The brightness compensation method for compensating brightness when the scanning system scans a plurality of pages comprises the steps of:

(a) A calibration step is performed for generating calibration information. In one embodiment, the calibration step scans a white sheet to generate calibration information associated with dark image and white image. The brightness compensation apparatus adjusts the scanned brightness by illumination control and gain control based on the calibration information.

(b) A statistic window setting region is established, wherein the statistic window setting region serves as a reference region of brightness statistic data associated with each of the pages.

(c) A first page is scanned based on the calibration information.

(d) The current brightness statistic data of a current page is generated based on the statistic window setting region and generating digital signal data corresponding to the current page. In first embodiment, the statistic window setting region is positioned in a region of a scanning platform outside the current page, and the current page is located in the scanning platform of the scanning system. In second embodiment, the statistic window setting region is positioned within a region of the current page. In third embodiment, the statistic window setting region is positioned outside a region of the current page and a scanning platform outside the current page, and the statistic window setting region is positioned in the scanning system.

(e) The current brightness statistic data is compared with a brightness target value.

As for step (e), when the current brightness statistic data is different from the brightness target value, an image processing apparatus utilizes an adjusting signal based on a brightness difference between the current brightness statistic data and the brightness target value for compensating the brightness of a light source so that the brightness for a next page is the same as the brightness target value. That is, the brightness of the light source and/or the gain value is adjusted. The next page is then scanned.

As for step (e) further, when the current brightness statistic data is the same as the brightness target value, the next page is scanned by using the brightness of the current page or the gain value of the image data.

(f) The scanning system determines whether completely scans the pages. When the scanning system incompletely scans the pages, the scanning system returns and proceeds step (d) until the scanning system completely scans the pages.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

The scanning system in the present invention utilizes the pulse width modulation (PWM) and/or control signal for controlling the driving signal, e.g. voltage or current, supplied to the light source in order to compensate the scanning brightness. Alternatively, the scanning system adjusts the gain value of the image data. Specifically, the scanning system instantly detects the brightness of each page or article on the platform of the scanning system and compensates the brightness based on the detecting result so that the scanning brightness associated with the pages or articles is uniform. In one embodiment, the scanning system of the present invention supports simplex scan mode and duplex scan mode.

Figure 1:
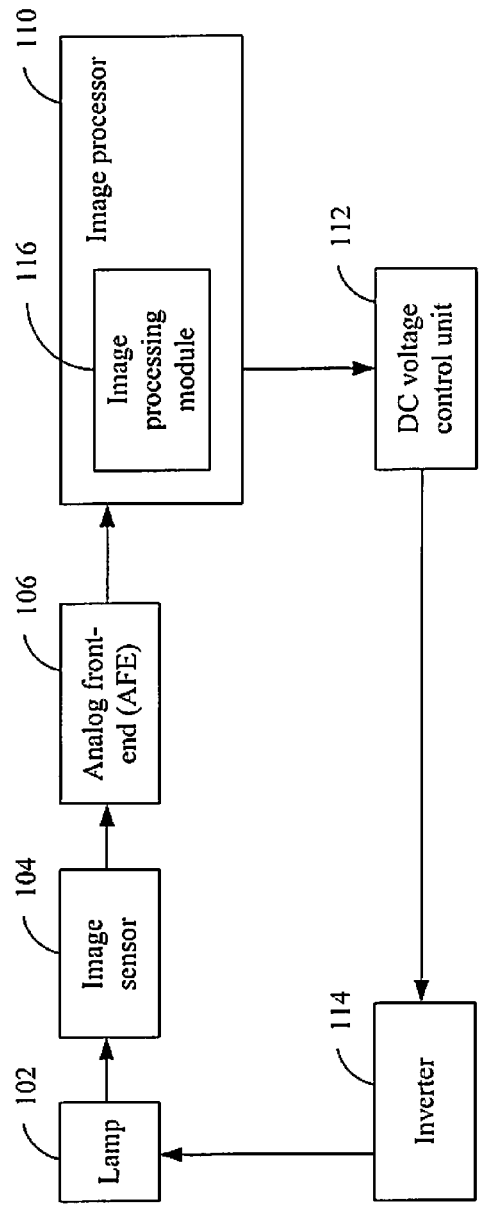
FIG. 1 is a schematic block diagram of a conventional scanner with brightness compensation.
Figure 2:
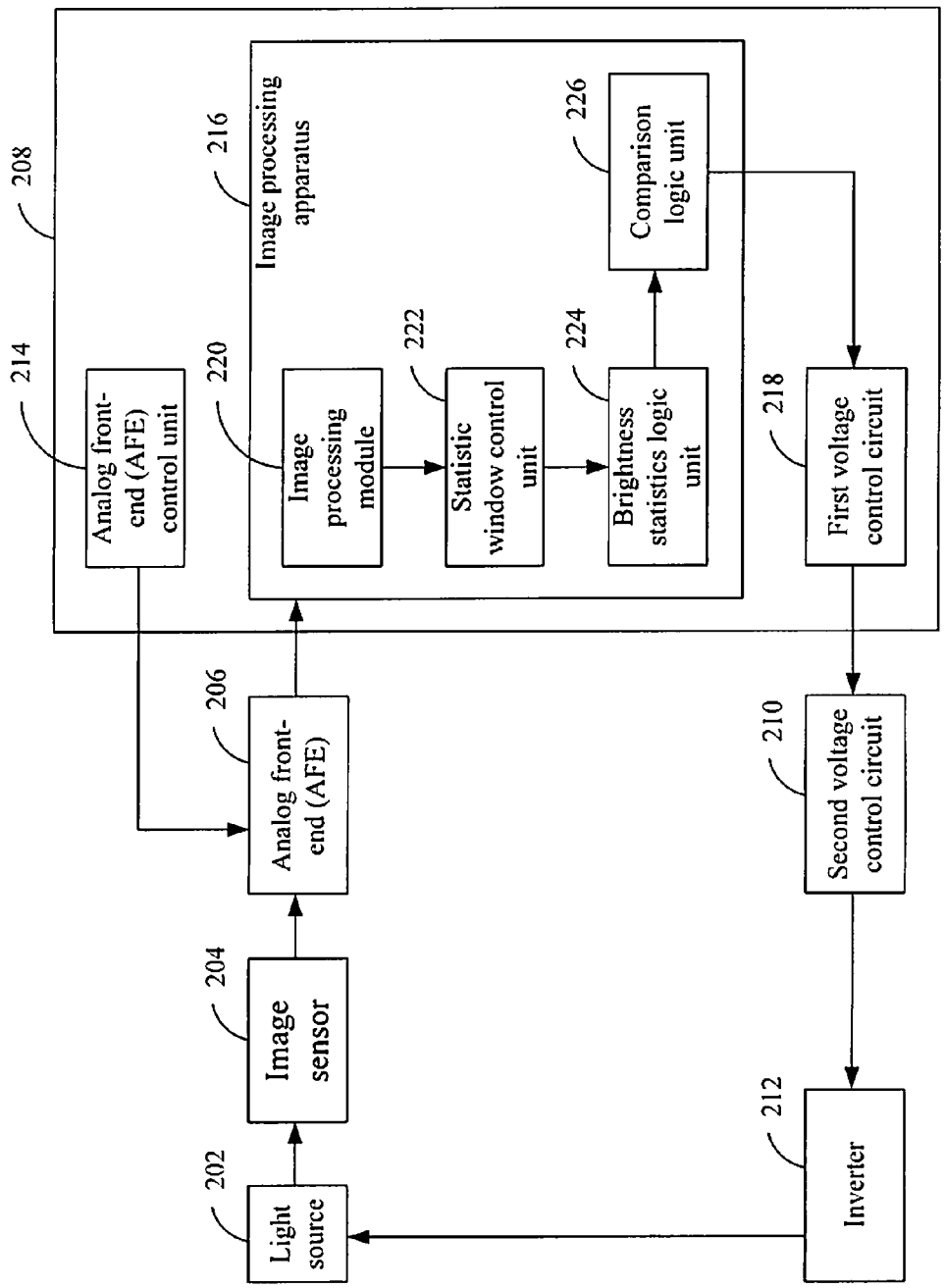
FIG. 2 is a schematic block diagram of a scanning system having a brightness compensation apparatus according to a first embodiment of the present invention.

FIG. 2 is a schematic block diagram of a scanning system 200 having a brightness compensation apparatus according to a first embodiment of the present invention. The scanning system 200 includes a light source 202, an image sensor 204, an analog-front-end (AFE) 206, a brightness compensation apparatus 208, a second voltage control circuit 210 and an inverter 212. The brightness compensation apparatus 208 includes an analog-front-end (AFE) control unit 214, an image processor 216 and a first voltage control circuit 218. The image processor 216 further includes an image processing module 220, a statistic window control unit 222, brightness statistic logic unit 224 and a comparison logic unit 226. For example, the light source 202 is a lamp. The image sensor 204 is a charge coupled device (CCD) and/or a contact image sensor (CIS). The image sensor 204 is implemented by one or more image sensing device. In one embodiment, the scanning system 200 can scan a plurality of pages of document continuously or articles. The brightness compensation is applicable to compensate the scanning brightness while the inaccuracy of the electronic components in the scanning system 200 results in unbalanced brightness.

In the scanning system 200, the light source 202 is coupled to the image sensor 204. The analog-front-end (AFE) 206 couples the image sensor 204 to the brightness compensation apparatus 208. The second voltage control circuit 210 couples the brightness compensation apparatus 208 to the inverter 212. The inverter 212 is coupled to the light source 202.

The light source 202 generates a brightness to illuminate the pages. For example, the light source 202 is one or more lamps. The image sensor 204 senses image data on the pages in order to output analog signal data corresponding to the image data. The analog-front-end 206 coupled to the image sensor 204 converts the analog signal data into digital signal data. In one embodiment, the analog-front-end 206 is one or more analog-front-end modules. The analog-front-end (AFE) 206 further includes a digital-analog converter (DAC), an analog-digital converter (ADC) and an operational amplifier (OAMP). The brightness compensation apparatus 208 coupled to the analog-front-end 206 adjusts the brightness illuminated on the pages. The second voltage control circuit 210 coupled to the first voltage control circuit 218 outputs a direct-current (DC) voltage. The inverter 212 coupled to the second voltage control circuit 210 receives the DC voltage and outputs an alternating current (AC) voltage with high level in order to control the brightness by at least one level of the DC voltage.

The brightness compensation apparatus 208 compensates the brightness of a light source when a scanning system scans a plurality of pages. The brightness compensation apparatus 208 is coupled to the analog-front-end (AFE) 206. The first voltage control circuit 218 couples the brightness compensation apparatus 208 to the second voltage control circuit 210.

The analog-front-end control unit 214 controls the gain value and offset value of digital signal data in an analog-front-end 206. The image processing apparatus 216 is coupled to the analog-front-end 216 processes the digital signal data. The first voltage control circuit 218 coupled to the image processing apparatus 216 outputs a voltage-adjusting signal for adjusting the brightness of the scanning system 200. In one embodiment, the voltage-adjusting signal is a pulse width modulation signal. The pulse width modulation signal adjusts a driving width in an on-duration period, a driving width in an off-duration period, and a frequency of the digital signal data. Alternatively, the voltage-adjusting signal is a direct-current (DC) voltage-controlled signal. The direct-current (DC) voltage-controlled signal is one-bit control signal or multi-bit control signal. In one embodiment, the one-bit or multi-bit control signal is selected from one group consisting of a pulse-triggering signal, a latch-triggering signal, a level-triggering signal and an edge-triggering signal.

In the image processing apparatus 216 having a brightness compensation mechanism, the image processing module 220 is coupled to the analog-front-end 206 of the scanning system 200. The statistic window control unit 222 couples the image processing module 220 to the brightness statistic logic unit 224. The comparison logic unit 226 couples the brightness statistic logic unit 224 to the first voltage control circuit 218 of the brightness compensation apparatus 208.

The image processing module 220 receives digital signal data which are converted format of analog image data. The statistic window control unit 222 coupled to the image processing module 220 establishes a statistic window setting region wherein the statistic window setting region serves as a reference region of brightness statistic data associated with each of the pages. The brightness statistic logic unit 224 coupled to statistic window control unit 222 generates current brightness statistic data of a current page based on the statistic window setting region. The comparison logic unit 226 coupled to the brightness statistic logic unit 224 compares the brightness statistic data with a brightness target value to determine whether the brightness statistic data is the same as the brightness target value for adjusting the brightness of the scanning system 200 according to the compared result between the brightness statistic data and the brightness target value.

In the comparison logic unit 226, when the current brightness statistic data is different from the brightness target value, the image processing apparatus 216 utilizes an adjusting signal based on a brightness difference between the current brightness statistic data and the brightness target value for compensating the brightness of a light source so that the brightness for a next page is the same as the brightness target value. When the current brightness statistic data is the same as the brightness target value, the scanning system 200 scans a next page by using the brightness of the current page.

In first embodiment, the statistic window setting region is positioned in a region of a scanning platform outside the current page, and the current page is located in the scanning platform of the scanning system 200. In second embodiment, the statistic window setting region is positioned within a region of the current page. In third embodiment, the statistic window setting region is positioned outside a region of the current page and a scanning platform outside the current page, and the statistic window setting region is positioned in the scanning system 200.

For example, the image processing apparatus 216 utilizes either a control register or a control look-up table for setting the statistic window control unit 222. The comparison logic unit 226 is a look-up table having voltage-controlled information for adjusting the brightness of a light source for the scanning system 200.

Figure 3:
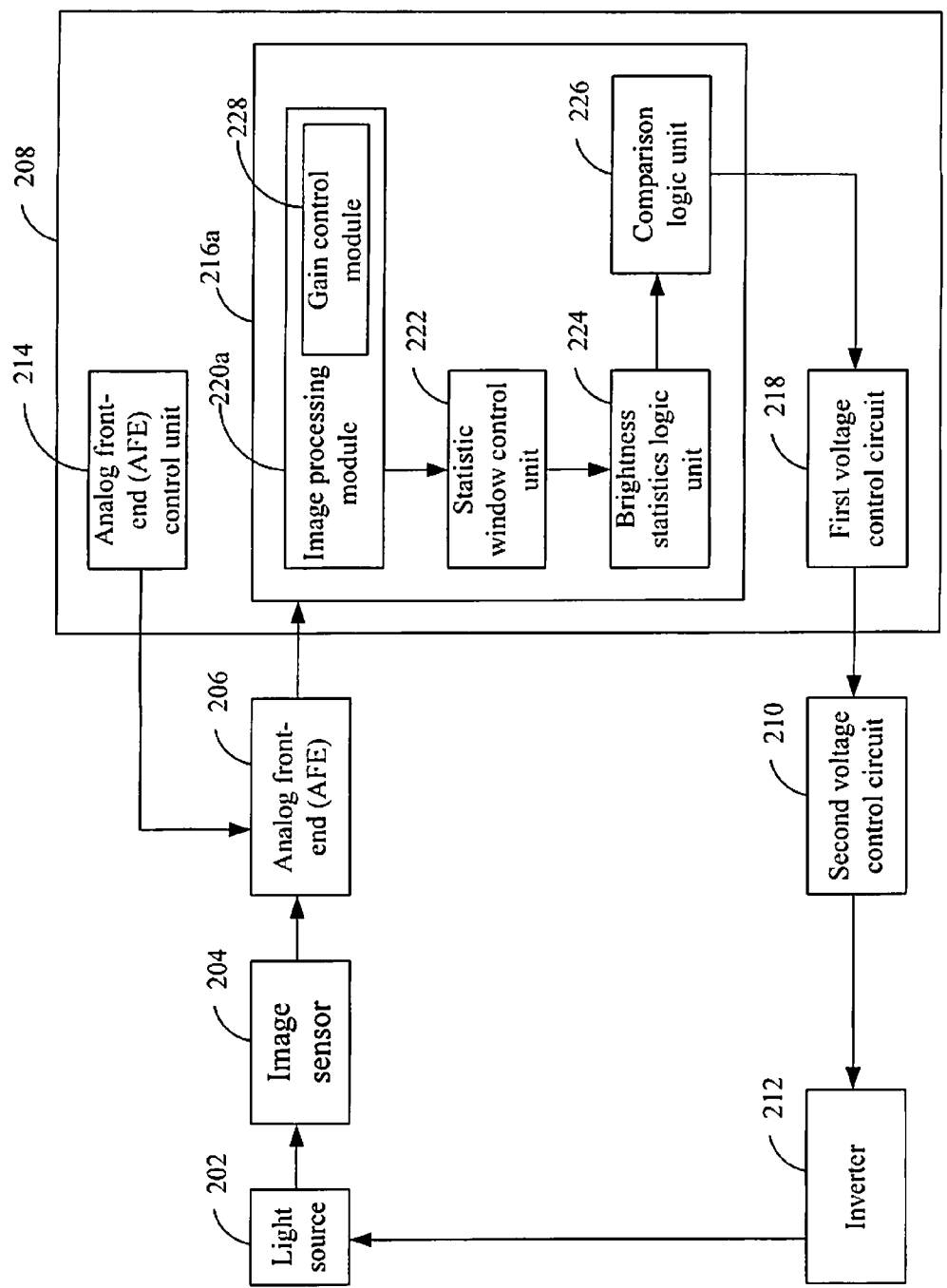
FIG. 3 is a schematic block diagram of a scanning system having a brightness compensation apparatus according to a second embodiment of the present invention.

Please refer to FIG. 2 and FIG. 3. It is a schematic block diagram of a scanning system 200a having a brightness compensation apparatus according to a second embodiment of the present invention. The scanning system 200a having a brightness compensation apparatus is similar to the scanning system 200 in FIG. 2. The difference is that the image processing apparatus 216a of scanning system 200a is different from the image processing apparatus 216 of scanning system 200. The image processing apparatus 216a further includes an image processing module 220a, a statistic window control unit 222, a brightness statistic logic unit 224, a comparison logic unit 226 and a gain control module 228.

When the first voltage control circuit 218 can only generate fixed DC voltage control signal and the second voltage control circuit 210 can only generate unique DC voltage, the gain control module 228 deposed in the image processing module 220a and the analog-front-end (AFE) control unit 214 are operated for adjusting the gain value and offset value of image data. Further, the image processing module 220a in the image processing apparatus 216a performs the gain control module 228 for adjusting and scaling the brightness of scanned image data by the processing apparatus 216a. The comparison logic unit 226 generates the gain value, e.g. digital gain, for scaling the brightness of scanned image data. In another case, the gain value can be acquired by a look-up table. Therefore, the gain control module 228 of scanning system 200a uniforms the brightness of each page of the document.

In the image processing apparatus 216a having a brightness compensation mechanism, the image processing module 220a is coupled to the analog-front-end 206 of the scanning system 200. The statistic window control unit 222 couples the image processing module 220a to the brightness statistic logic unit 224. The comparison logic unit 226 couples the brightness statistic logic unit 224 to the first voltage control circuit 218 of the brightness compensation apparatus 208.

Specifically, the image processing module 220a receives digital signal data which are converted format of analog image data and the image processing module 220a performs the gain control module 228. The statistic window control unit 222 coupled to the image processing module 220a establishes a statistic window setting region wherein the statistic window setting region serves as a reference region of brightness statistic data associated with each of the pages. The brightness statistic logic unit 224 coupled to statistic window control unit 222 generates current brightness statistic data of a current page based on the statistic window setting region. The comparison logic unit 226 coupled to the brightness statistic logic unit 224 compares the brightness statistic data with a brightness target value to determine whether the brightness statistic data is the same as the brightness target value for adjusting the brightness of the scanning system 200a according to the compared result between the brightness statistic data and the brightness target value. The brightness target value is for the purpose of brightness comparison.

In the comparison logic unit 226, when the current brightness statistic data is different from the brightness target value, the image processing apparatus 216a utilizes an adjusting signal based on a brightness difference between the current brightness statistic data and the brightness target value for adjusting a gain value of an analog-front-end (AFE) 206 in the scanning system 200a. When the current brightness statistic data is different from the brightness target value, the image processing apparatus 216a utilizes an adjusting signal based on a brightness difference between the current brightness statistic data and the brightness target value for scaling the image data.

In first embodiment, the statistic window setting region is positioned in a region of a scanning platform outside the current page, and the current page is located in the scanning platform of the scanning system 200. In second embodiment, the statistic window setting region is positioned within a region of the current page. In third embodiment, the statistic window setting region is positioned outside a region of the current page and a scanning platform outside the current page, and the statistic window setting region is positioned in the scanning system 200.

For example, the image processing apparatus 216*a* utilizes either a control register or a control look-up table for setting the statistic window control unit 222. The comparison logic unit 226 is a look-up table having gain-controlled information for adjusting the brightness of a light source for the scanning system 200*a*.

According to the above-mentioned descriptions, when the brightness illuminated by the light source of scanning system for the pages or articles is not uniform, the brightness compensation apparatus 208 adjusts the brightness of the light source or the gain value of image data to balance the brightness of the image so that the brightness of each page or article is uniform. In one embodiment, before the pages are scanned, the scanning system 200, 200*a* performs at least one calibration step for generating calibration information. The calibration steps further includes the calibrations of analog-front-end (AFE), dark shading, white shading, and offset/gain value of image data. The brightness compensation apparatus 208 utilizes a statistics window setting to generate the brightness statistics and compensates the brightness difference based on the brightness statistics to meet the requirement of the brightness target value.

Figure 4:
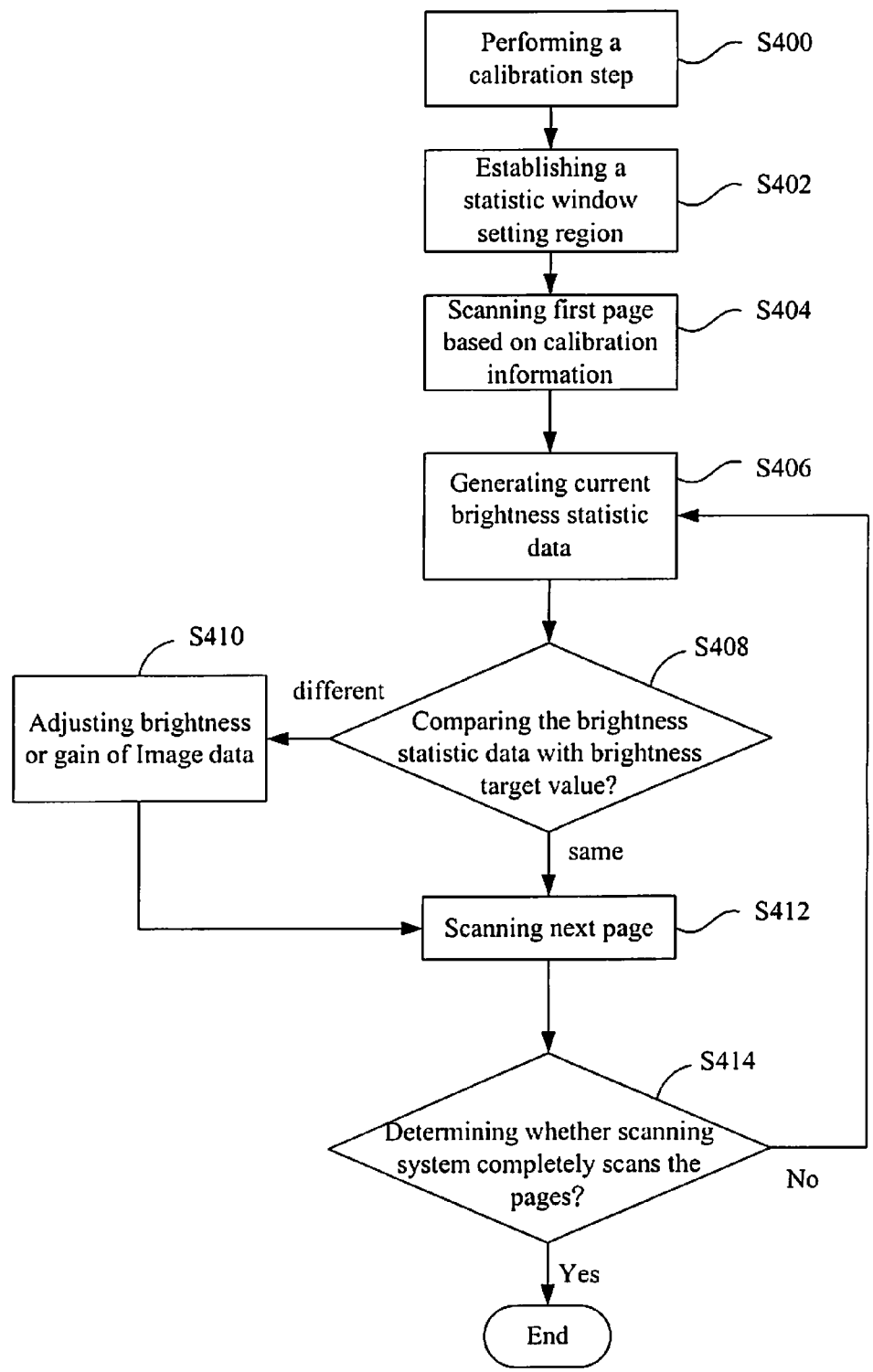
FIG. 4 is a flow chart of performing a brightness compensation method according to one embodiment of the present invention.

Please refer to FIGS. 1-3 and FIG. 4. FIG. 4 is a flow chart of performing a brightness compensation method according to one embodiment of the present invention. The scanning system 200 includes a light source 202, an image sensor 204, an analog-front-end (AFE) 206, a brightness compensation apparatus 208, a second voltage control circuit 210 and an inverter 212. The brightness compensation apparatus 208 includes an analog-front-end (AFE) control unit 214, an image processor 216 and a first voltage control circuit 218. The image processor 216 further includes an image processing module 220, a statistic window control unit 222, brightness statistic logic unit 224 and a comparison logic unit 226. In one embodiment, the scanning system 200 can scan a plurality of pages of document continuously or articles. The brightness compensation method for compensating brightness when the scanning system 200 scans a plurality of pages comprises the steps of:

In step S400, a calibration step is performed for generating calibration information. In one embodiment, the calibration step scans a white sheet to generate calibration information associated with dark image and white image. The brightness compensation apparatus 208 adjusts the scanned brightness by illumination control and gain control based on the calibration information. The gain control is used to adjust the gain value of image data and/or to control the gain value and an offset value of digital signal data in an analog-front-end control unit 214.

In step S402, a statistic window setting region is established, wherein the statistic window setting region serves as a reference region of brightness statistic data associated with each of the pages.

In step S404, a first page is scanned based on the calibration information.

In step S406, current brightness statistic data of a current page is generated based on the statistic window setting region and generating digital signal data corresponding to the current page. In first embodiment, the statistic window setting region is positioned in a region of a scanning platform outside the current page, and the current page is located in the scanning platform of the scanning system 200. In second embodiment, the statistic window setting region is positioned within a region of the current page. In third embodiment, the statistic window setting region is positioned outside a region of the current page and a scanning platform outside the current page, and the statistic window setting region is positioned in the scanning system 200.

In step S408, the current brightness statistic data is compared with a brightness target value.

As for step S408, when the current brightness statistic data is different from the brightness target value, an image processing apparatus 216 utilizes an adjusting signal based on a brightness difference between the current brightness statistic data and the brightness target value for compensating the brightness of a light source for adjusting the brightness of the scanning system according to the compared result between the brightness statistic data and the brightness target value so that the brightness for a next page is the same as the brightness target value, as shown in step S410. That is, the brightness of the light source and/or the gain value of the image data is adjusted. The next page is then scanned, as shown in step S412.

As for step S408 further, when the current brightness statistic data is the same as the brightness target value, the next page is scanned by using the brightness of the current page or the gain value of the image data, as shown in step S412.

In step S414, the scanning system 200 determines whether completely scans the pages. When the scanning system incompletely scans the pages, the scanning system 200 returns and proceeds step S406 until the scanning system 200 completely scans the pages.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A scanning system having a brightness compensation mechanism for scanning a plurality of pages, the scanning system comprising:

a light source, for generating a brightness to illuminate the pages;

an image sensor, for sensing image data shown on the pages in order to output analog signal data corresponding to the image data;

an analog-front-end coupled to the image sensor, for converting the analog signal data into digital signal data;

a brightness compensation apparatus coupled to the analog-front-end, the brightness compensation apparatus comprising:

an image processing apparatus, for processing the digital signal data, for generating current brightness statistic data of a current page based on the statistic window setting region, and for comparing the brightness statistic data with a brightness target value for adjusting brightness of the scanning system according to the compared result between the brightness statistic data and the brightness target value; and a first voltage control circuit coupled to the image processing apparatus, for outputting a voltage-adjusting signal for adjusting the brightness;

a second voltage control circuit coupled to the first voltage control circuit, for outputting a direct-current (DC) voltage; and an inverter coupled to the second voltage control circuit, for receiving the DC voltage and outputting an alternating current (AC) voltage with high level in order to control the brightness by at least one level of the DC voltage.

2. The scanning system of claim 1, wherein when the current brightness statistic data is different from the brightness target value, the image processing apparatus utilises an adjusting signal based on a brightness difference between the current brightness statistic data and the brightness target value for compensating the brightness of a light source so that the brightness for a next page is the same as the brightness target value.

3. The scanning system of claim 1, wherein when the brightness statistic data is the same as the brightness target value, the scanning system scans the next page by using the brightness of the current page.

4. The scanning system of claim 1, wherein the statistic window setting region is positioned in a region of a scanning platform outside the current page or within a region of the current page.

5. The scanning system of claim 1, wherein the statistic window setting region is positioned outside a region of the current page and a scanning platform outside the current page, and the statistic window setting region is positioned in the scanning system.

6. The scanning system of claim 1, further comprising either a control register or a control look-up table for setting the statistic window control unit.

7. The scanning system of claim 1, wherein the voltage-adjusting signal is a pulse width modulation signal.

8. The scanning system of claim 1, wherein the pulse width modulation signal adjusts a driving width in an on-duration period, a driving width in an off-duration period, and a frequency of the digital signal data.

9. The scanning system of claim 1, wherein the voltage-adjusting signal is a direct-current (DC) voltage-controlled signal.

10. The scanning system of claim 1, wherein the direct-current (DC) voltage-controlled signal is one-bit control signal and the one-bit control signal is selected from one group consisting of a pulse-triggering signal, a latch-triggering signal, a level-triggering signal and an edge-triggering signal.

11. The scanning system of claim 1, wherein the analog-front-end further comprises a digital-analog converter, an analog-digital converter and an operational amplifier.

* * * * *